United States Patent [19]

Howe et al.

[11] Patent Number: 4,530,082

[45] Date of Patent: Jul. 16, 1985

[54] OPTICAL DISC WRITE/READ EMPLOYING PASSIVE FOCUS MAINTENANCE

[75] Inventors: Dennis G. Howe, Pittsford; James A. Barnard, Avon, both of N.Y.

[73] Assignee: Eastman Kodak Company, Rochester, N.Y.

[21] Appl. No.: 392,861

[22] Filed: Jun. 28, 1982

[51] Int. Cl.³ ............................................... G11B 7/12
[52] U.S. Cl. .................................. 369/112; 369/111; 369/261
[58] Field of Search .................. 369/100, 109–112, 369/44, 45, 46, 261

[56] References Cited

U.S. PATENT DOCUMENTS

| | | | |
|---|---|---|---|
| 2,554,679 | 5/1951 | Mitchell | 369/112 |
| 3,950,621 | 4/1976 | Bouwhuis | 369/112 |
| 4,039,764 | 8/1977 | Bricot et al. | 179/100.41 L |

Primary Examiner—Raymond F. Cardillo, Jr.
Attorney, Agent, or Firm—Warren W. Kurz

[57] ABSTRACT

The quality of spot-focus of optical writing and reading light upon the information surface of a flexible optical disc is passively enhanced by (1) rotating the disc with its neutral plane stabilized in space and (2) directing such light through the optical disc support into precise spot-focus on the information surface. With this technique spherical aberration induced by the disc support compensates for thickness variation of the support. Various structural embodiments are disclosed.

4 Claims, 6 Drawing Figures

OPTICAL DISC WRITE/READ EMPLOYING PASSIVE FOCUS MAINTENANCE

BACKGROUND OF THE INVENTION

1. Field of the Invention

The present invention relates to methods and apparatus for optically writing and/or reading information on optical discs and more specifically to improvements whereby focus of write/read light on the information surface of the optical disc is corrected passively with respect to thickness variations of the optical disc.

2. Description of the Prior Art

The currently preferred optical disc technology employs disc elements with spiral or concentric tracks of minute (usually on the order of a micron or less in size), optically-detectable marks. One real-time mode of recording (writing) such marks is by scanning the disc with a small focused spot of radiation (e.g., from a laser) which is modulated "off or on" according to an electrical signal representative of the information to be written. Information is recovered (read) by scanning the tracks with an unmodulated, equivalently small, tightly focused light spot. The recovered information is in the form of a fluctuating electrical signal obtained from a photodetector that senses the modulated read-out light reflected from the recorded disc.

In order to write and read information in the form of such minute markings, optical systems of relatively high numerical aperture are used to focus light to equivalently minute spots. Such optical systems have extremely small depths of focus and the proper positional relation between the writing or reading optical system and the optical disc surface must be stringently maintained. One approach has been to utilize highly-precise turntables for supporting and rotating the optical discs in a predetermined plane. Such apparatus is expensive, but even with such costly turntables it is usually necessary also to provide complex focus-servo devices which effect lens adjustment in response to minute variations in the position of the surface of the optical disc relative to the lens. Such variations are caused by thickness variations and non-flatness of the disc or turntable surface or apparatus vibrations. Since the discs rotate at high speeds (e.g., 1800 RPM), these focus-servo devices must respond at high frequencies (e.g., 500 Hz. for discs with ground glass substrates and in the range of 1000 to 3000 Hz. for discs with molded plastic substrates). Also, a subsystem to sense the focus error and an electronic feedback loop is required. Therefore these focus-servo devices are also costly, and fragile.

The costs and care of such sophisticated writing and reading apparatus do not present insurmountable problems for some industrial or laboratory applications, but they do present significant obstacles for consumer and business systems applications. As an alternative approach, it has been suggested to form master discs, with the sophisticated apparatus described above, and to replicate flexible read-only discs from the masters. Such flexible, read-only discs are rotated to fly on an air cushion and various devices are provided to positively constrain the disc's information surface toward a predetermined position relative to the focal point of the reading lens means.

U.S. application Ser. No. 160,769, entitled "Improved Optical Disc Method, Media and Apparatus for Writing and/or Reading Information", filed June 18, 1980, in the names of Geyer and Howe provides an alternative approach for writing and/or reading on flexible flying discs. In contrast to the constrained position approach described above, the Geyer and Howe approach flies flexible optical discs, in a dynamically stabilized condition, specifically avoiding localized constraint structures which force the disc to a predetermined position relative to the working lens means. Thus the Geyer and Howe approach substantially stabilizes the flying disc's neutral plane (the plane within a disc along which material is neither compressed nor extended during bending) in a plane of rotational equilibrium and the information surface of such disc has thereby been stabilized to an extent yielding unexpectedly precise writing and reading results. However the approach of the Geyer and Howe application still yields focus imprecision to the extent of thickness variations in the disc. That is, disc thickness variations cause different surface portions of the disc to be different distances from the disc's neutral plane; and, although the disc's neutral plane is stable relative to the focal point of the working lens, the disc's record surface moves in relation to that focal point by one-half the thickness variation "$\Delta t$" from a nominal disc thickness "t".

SUMMARY OF THE INVENTION

One significant purpose of the present invention is to provide improved techniques, following the approach of Geyer and Howe but further reducing the need for focus adjustment in optical disc write/read systems. A more particular purpose of the present invention is to substantially reduce those changes in the focus relation (between a write/read beam and a flying optical disc's information surface) that are caused by disc thickness variation. An important advantage of the present invention is that it simplifies focus control in optical disc writing and/or reading.

The above and other objectives and advantages are achieved by the present inventon which in one aspect constitutes an improved method of writing and/or reading information with lens means having an aerial paraxial focal length (FL) and an optical disc comprising an information surface on a flexible support which is substantially transparent and nonbirefringent, generally flat and of generally uniform thickness. Such disc is rotated with its neutral plane substantially stabilized in space and write/read light is directed onto the disc information surface through the stabilized disc support, whereby support-induced spherical aberration compensates for support thickness variation and precise spot-focus on said information surface is passively enhanced. One preferred embodiment of the invention comprises directing write and/or read light toward the information surface, through the lens means and the transparent support, and rotating the disc with its neutral plane substantially stabilized in space with a distance $$FL - \left(\frac{2t}{n} - t\right)$$

between the lens means' second principal point and the disc's neutral plane, where t and n are respectively the nominal thickness and refractive index of the disc support.

Disc write/read apparatus and disc-apparatus systems which cooperate to effect such passive focus enhancement constitute additional aspects of the present invention.

BRIEF DESCRIPTION OF THE DRAWINGS

The subsequent description of preferred embodiments of the present invention refers to the attached drawings wherein.

DETAILED DESCRIPTION OF THE PREFERRED EMBODIMENTS

Figure 1:
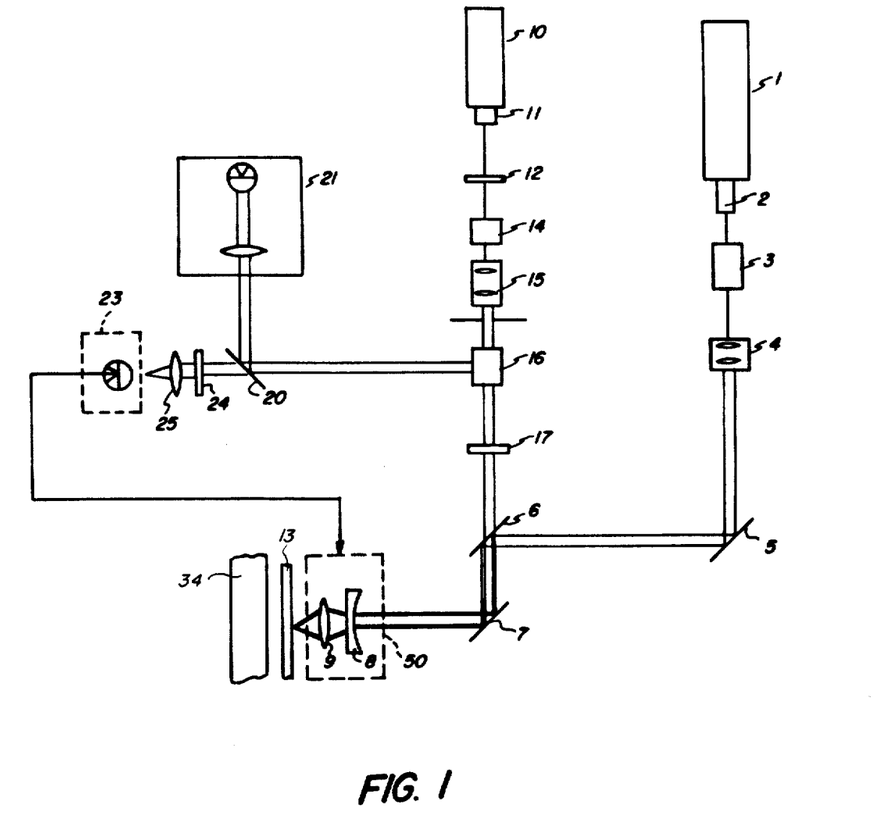
FIG. 1 is a schematic diagram of an optical write/read system useful in the practice of the present invention.

FIG. 1 schematically illustrates one optical disc write/read apparatus in accordance with the present invention. The writing means comprises a writing laser 1 which directs light of a first wavelength through a polarization rotator 2 to acousto-optic modulator 3 adapted to receive an electrical information signal and modulate the writing light beam in response thereto. Light exiting modulator 3 passes through a focal telescope optics 4 and is directed via mirrors 5 and 7 and beam-splitter 6 to a negative correction lens 8 and the focusing objective 9. By this optical means, light from the laser 1 can be controlled to form tracks of micron-sized marks on the rotating disc 13 as it moves above the stabilizing reference surface 34. Preferred disc and reference surface configurations are explained in much more detail subsequently.

The reading means shown in FIG. 1 comprises a reading laser 10 which directs light of a second wavelength sequentially through polarizing rotator 11, polarizer 12, tracking modulator 14, afocal telescope optics 15, polarizing beamsplitter 16, one-quarter wave plate 17, beamsplitter 6 and mirror 7 to elements 8 and 9. Light from the focused read spot is reflected from the disc 13 and returns through elements 9-6 and 17 to polarizing beamsplitter 16. The reflected read light is then directed to beamsplitter 20 where it is divided and directed both to a signal detection system 21 and a focus detection system 23. The focus detection system 23 receives read light via bandpass filter 24 and a field lens 25. Focus system 23 can be one of various kinds known in the art, e.g., including a Foucault knife and a split diode. The read detector system 21 similarly can take various forms known in the art, e.g., such as disclosed in U.S. Pat. No. 4,065,786.

Figure 2:
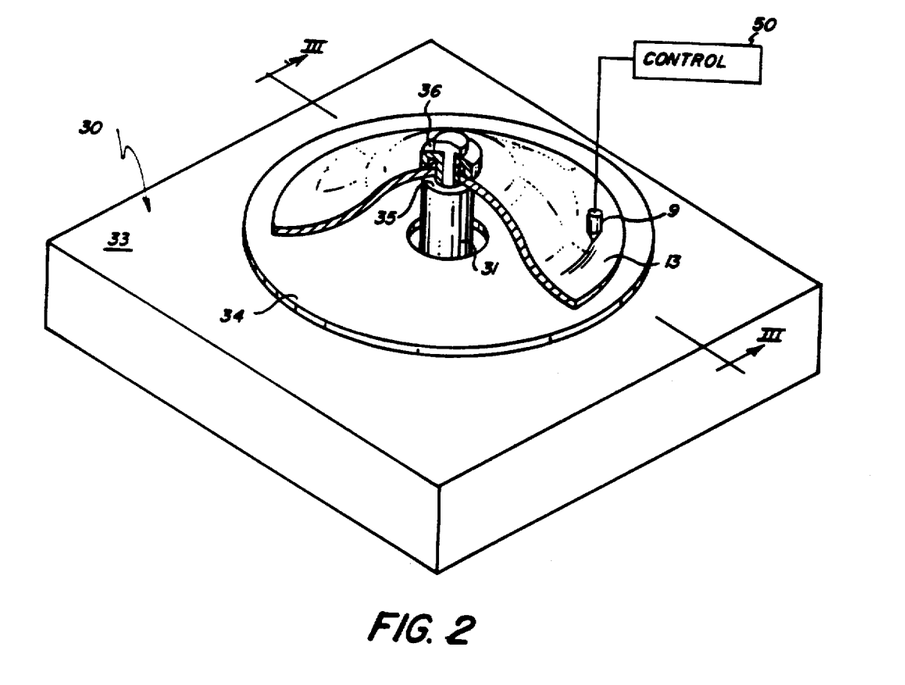
FIG. 2 is a perspective view of one configuration useful for flying an optical disc for practice of the present invention.

Referring now to FIG. 2, one preferred embodiment for effecting precise stabilization of a flexible optical disc is shown. Within the write/read apparatus shown in FIG. 1, a rotatable drive shaft 31 is mounted in housing 30 with its rotational axis normal to the deck 33. The stabilizing reference surface 34 is adjustably supported on the deck 33 in concentric relation around shaft 31. The optical disc 13 is clamped by cap 36 to the top 35 of the drive shaft 31, which is located at a predetermined height above the reference surface 34.

Figure 3:
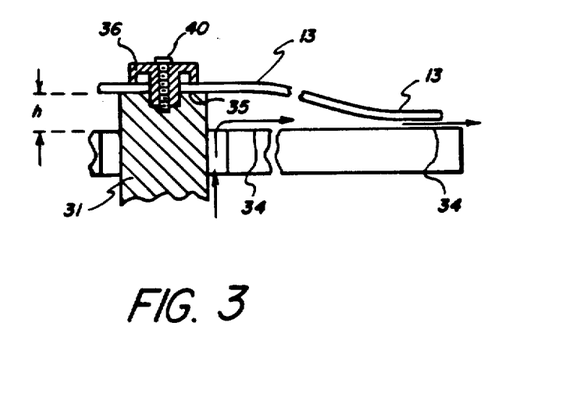
FIG. 3 is a fragmented cross-sectional view of the FIG. 2 configuration.

More detail of the FIG. 3 apparatus is disclosed in the aforementioned Geyer and Howe application Ser. No. 160,769 which is incorporated herein by reference. In general, the shaft 31 is coupled to a motor (not shown) which is adjustably supported to facilitate adjustment of the shaft axis to a condition generally normal to the deck 33, with its top surface 35 at a predetermined height above stabilizing reference surface 34. The top surface 35 is precisely machined to assure it is normal to the shaft axis of rotation. In accordance with a highly preferred mode, the disc-aligning portion of this surface has a variation of less than ±0.2 milliradians from the plane normal to the axis of rotation, when measured by rotating the shaft by hand. Adjustable elements (not shown) are provided to assure reference surface 34 is precisely parallel to top surface 35 and precisely normal to the axis of rotation of shaft 31.

As shown best in FIG. 3, clamp 36 has a protruding annular clamping portion and a centering portion which is adapted to fit snugly in a recess in the top of shaft 31. A precisely centered and sized aperture in disc 13 thus can cooperate with the centering portion of clamp 36 so as to precisely radially align the disc center with the axis of shaft rotation. When clamp 36 is in place in the shaft recess and secured, e.g. by a bolt 40, the annular clamping portions around its periphery secure the underlying portions of the disc in precise parallel relation to the shaft top 35 and thus the top of reference surface 34. Additionally, this peripheral clamping isolates the exterior peripheral portions of the disc 13 from any stresses created by the formation of its central aperture. It is also highly preferred that peripheries of clamp 36 and shaft 31 have a variation not exceeding ±0.0001" with respect to their radial distance from this axis of rotation. This is important so that the engagement zone with the disc is axially symmetrical and will initiate uniform stresses within the disc. It also is highly preferred that the shaft have at least a predetermined minimum diameter, in relation to a given diameter disc, so that the disc is not excessively stressed, either in the radial or tangential directions during rotation. For a 12" disc rotating at 1800 RPM, a shaft diameter of 1⅛" is highly useful.

It will be noted that the central aperture in reference surface 34 exceeds the diameter of shaft 31 so as to leave an annular air passage from the atmosphere to the radially central region of the zone area between disc 13 and reference surface 34. In accord with the illustrated configuration, an annular passage between a 1⅛" outer diameter shaft 31 and an inner diameter opening of 1¼" in reference surface 34 is highly useful. However, the size of this opening can vary so long as air is not so severely throttled as to cause contact between the disc and reference surface, during rotation, and the air flow into the gap is quiet (i.e., not turbulent). It is preferred that the annular passage communicate freely with ambient atmosphere via the space beneath the reference surface and the interior of housing 30.

Before proceeding to a description of how the apparatus shown in FIGS. 2 and 3 rotates disc 13 for writing and reading by the optical system shown in FIG. 1, it is appropriate to describe features of the disc 13 itself in more detail, for certain disc features are important.

Figure 4:
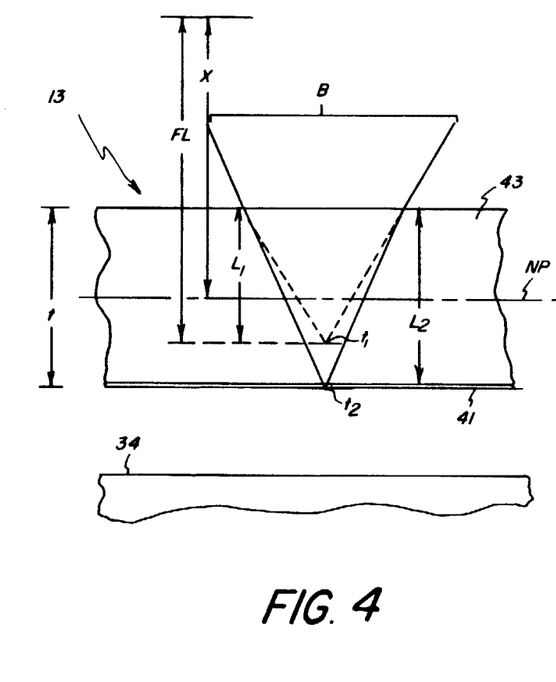
FIG. 4 is an enlarged diagrammatic view illustrating a preferred relationship, in accord with the present invention, between a nominal thickness portion of a flying optical disc and a focused write/read light beam.

FIG. 4 shows, in cross-section a portion of one useful disc 13 and the disc embodiment there illustrated can be seen to comprise a record layer 41 and a support 43.

One preferred mode for practicing the present invention is to direct write/read light to the record layer 41 through the support 43 with the disc record surface 41 opposing the apparatus reference surface 34. For detecting read light with this arrangement it is preferred that read light be reflected back through the support to the detector. The support 43 therefore is constructed to be substantially transparent to the write/read wavelengths utilized and also preferably is substantially non-birefringent and substantially homogeneous and free from striae and significant occlusions. The support should be of thickness which accommodates well stabilized flight. A highly preferred range is 2-6 mils; however, other thicknesses are useful.

As noted, one preferred detection mode is for light to be reflected back through support 43 to the detector and therefore it is preferred that record layer 41 be reflective to read light (and absorptive to write light). Alternatively the record layer can be absorptive to both write and read light and an additional reflective layer (not shown) provided over the record layer. One preferred construction for the record layer 41 is of sputtered or vapor-deposited tellurium. However, the record layer can be formed of many other reflective materials, e.g. titanium or bismuth. The particular mechanisms of recording mark formation and light readout are not critical as to practice of the invention except insofar as they should not adversely affect the disc flatness and thickness characteristics outlined below.

For proper rotational stabilization of the disc's neutral plane, it is important that optical discs have good flatness and thickness. It is also highly preferred that the disc have a smooth, substantially cylindrical periphery which is radially symmetric to its centering aperture.

With respect to flatness, it is highly desirable that the support, and disc itself have extremely little curl and core set. As a test for a preferred support material, a thin, e.g. 4 mil, 12" diameter disc element formed of the proposed material should be placed on a planar surface in an unconstrained condition. It is preferred that no peripheral or central portion of the disc element raise more than about 1/32" from the planar surface. It is highly preferred that such element have no portion that raises more than about 1/64" in such test. It is to be understood however, that useful results can be obtained with more generally flat support materials, not meeting the above, preferred criterion. For example, good stabilization of discs over useful annular portions thereof have been attained with disc supports having peripheral curl of ¼" or even ½".

With respect to uniformity of thickness, it is preferred that the disc support, and the disc itself, have a thickness variation of about $\pm 2.5\mu$ or less. Again, it is to be understood that support materials of more generally uniform thickness may be useful in certain applications in accordance with the present invention. For example, where depth of focus is less critical such as in some read-only applications, useful materials could have thickness variations in excess of the defined criterion.

Having described the useful and preferred disc characteristics, the preferred structure and mode for rotating the disc with its neutral plane in a highly stabilized condition will be explained. In general, it is extremely important, for optimal practice of the invention, that the stabilizing reference surface 34 be properly configured and that the height of the top surface 35 of shaft 31 (and thus the disc's orientation plane) be properly positioned relative to reference surface 34.

More specifically, the preferred reference surface configuration has three important characteristics. First, it should be aerodynamically smooth and featureless. That characteristic of "featureless" denotes a continuous surface in distinction to prior art techniques in which grooves, apertures or sensors were incorporated in the surface. Turned and polished metal surfaces or chrome plated surfaces have been found to be preferred from the smoothness viewpoint. Second, it is preferred that the reference surface be radially symmetric with respect to the axis of rotation of shaft 31 and non-convex with respect to the plane of the shaft top 35 (i.e., the plane of disc orientation). The planar surface provided by the annular reference member 34 in the illustrated embodiment of course meets this requirement. However, it may be preferred to modify the surface configuration of reference member 34 to make it symmetrically concave, e.g., as a surface of revolution defined by a curve sloping upwardly from the central axis to the periphery. Such modifications can be useful to cause the stabilized condition of the rotating disc to be more planar in nature. In regard to symmetry, we have found it to be highly preferred that, at given radii, the reference surface have less than 1 mil (most preferably $\pm 0.5$ mil) variation in height from a plane normal to the axis of rotation of shaft 31. Finally, the periphery of the reference surface should extend at least to the periphery of the disc. That is, it should not terminate substantially radially inwardly from the disc periphery or air turbulence will occur, disrupting any effective stabilization of the rotating disc.

As mentioned above, the height of the reference surface 34 in relation to the top surface 35 of shaft 31 is also important. The preferred limits for the variation of this distance ("h" in FIG. 3) can best be described functionally in regard to the certain peripheral conditions created between the disc and reference surface during disc rotation. That is, the maximum preferred distance for height h is one which, when the disc is rotating at its nominal speed, just avoids the condition of excessive turbulence at the disc periphery. For a disc having a 0.004" thickness and a 12" diameter, rotating at 1800 RPM over a planar reference surface, such as shown in the drawings, this maximum height "h" occurs at about 0.015".

The minimum for the height h is a function of particles which are present in air and that it should in no event be less than as to maintain a peripheral air gap of about 0.001" between the disc and reference surface. Smaller peripheral gaps have two compounding adverse effects which prevent any effective stabilization. First, dust particles of 0.001" will become caught in the passage and disturb the laminar nature of the air flow. Second, even if particles are not "caught" to an extent blocking air passage, they forcefully impact the too closely opposing surfaces causing a build up of electrostatic charges. Such charges have been recognized in the art as a significant deterrent to stabilized disc flight.

Another problem creating electrostatic disturbing forces can occur during the start of disc rotation, i.e., its take-off. At this stage there is inherently a frictional rubbing between the disc and the reference surface. The extent of this effect can be lessened to some extent by reference surface configuration (e.g., making it concave) and by choice of material (i.e., a chrome-coated reference surface exhibits a good position in the triboelectric series relative to plastic supports). It is useful to provide a quick disc take-off, e.g., preferredly effected by use of a high torque motor and relative lightweight construction of the moving parts. Alternatively peripheral lifter elements, e.g., solenoids, might be used; however, these should be precisely constructed and quickly retracted after disc take-off, to a condition leaving the reference surface featureless. In the embodiment illustrated in FIG. 2, a protective coating can, if desired, be provided over the disc's recording layer to prevent damage to the recording layer by abrasion on the reference surface.

The nominal disc rotational rate can be selected for the signal format but should be sufficiently high so that dynamic forces straighten the disc to the modified planar condition above the reference surface. The air supply to the central region is preferredly at atmospheric pressure, but we have found that good stabilization can be obtained with slightly negative pressure sources. However, the pressure source should not be significantly positive with respect to atmospheric. It is preferable that the air introduction means provide uniform flow along its circumference, thus the annular opening between the shaft and reference surface is preferred.

Thus, if a properly configured disc is properly supported for rotation and if this outward movement of air is highly uniform in all radial directions, a highly stabilized equilibrium condition can be attained between the dynamic, elastic, fluid and gravitational forces acting on the disc and a remarkable stabilization in vertical displacement of a large annular portion of the disc is attained. With the flexible optical disc so rotating, its neutral plane is stabilized in a plane of rotational equilibrium and the improvements of the present invention are implemented. The technique for providing passive focus compensation with respect to disc thickness variations is described with reference to FIGS. 4–6.

Consider the situation shown in FIG. 4 where a beam of write or read light B is focused through a portion of optical disc support 43 of nominal thickness "t" and of refractive index "n" (greater than 1) such that focus occurs on the disc record surface 41. The aerial paraxial focus $f_1$ (i.e., the position of paraxial focus if the support material were removed) occurs at distance $L_1$ from the top of the support material, and the real paraxial focus $f_2$ occurs at distance $L_2$ from the top surface of the support material.

Figure 5:
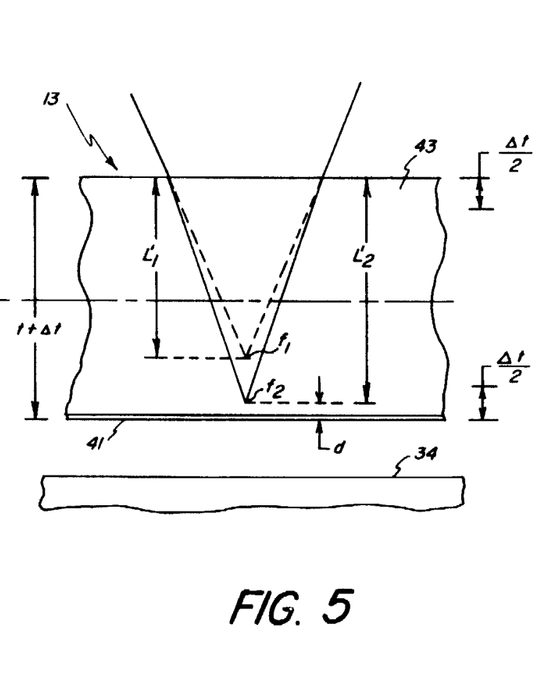
FIG. 5 is a view similar to FIG. 4 but illustrating a disc portion which exceeds nominal thickness.

It will be understood by those skilled in the art that $L_2$ is related to $L_1$ by the equation $L_2 = n \cdot L_1$. In accordance with the invention one places the aerodynamically stabilized support 43 in relation to the focusing objective such that $L_1 = t/n$, where t is the nominal thickness of the material. Referring to FIG. 5, when the support material thickness changes from the nominal thickness t by an amount $\Delta t$, the aerial paraxial focus and real paraxial focus change such that $$L_1' = \frac{t}{n} + \frac{\Delta t}{2} \tag{1}$$

and $$L_2' = n\left(\frac{t}{n} + \frac{\Delta t}{2}\right) = t + \frac{n\Delta t}{2}. \tag{2}$$

Thus the real paraxial focus $f_2$ will occur at a distance $L_2 = t + \Delta t$ (i.e., on the material lower surface) if the refractive index of the support 43 is equal to 2. However, for a material of refractive index $n = 1.5$, $L_2 = t + 0.75 \Delta t$ and real paraxial focus $f_2$ falls short of the lower surface by 0.25 $\Delta t$.

Now consider the effects of spherical aberration. The focusing lens means 9 should be corrected to work through a thickness t of index n material, and when working through an additional thickness $\Delta t$ of material will produce longitudinal spherical aberration (SA) given by $$SA = \frac{\Delta t}{2}\left\{\left(\frac{n^2 - (NA)^2}{1 - (NA)^2}\right)^{\frac{1}{2}} - n\right\} \tag{3}$$

where NA is the numerical aperture of the focusing lens. This is overcorrected spherical (the marginal rays focus further away from the lens than do the paraxial rays). The record surface 41 of the stabilized web (of index n and thickness $t + \Delta t$) is situated a distance $$d = \Delta t\left(1 - \frac{n}{2}\right)$$

beyond the paraxial focus $f_1$ (equation 2) and the radius b of the spherically aberrated blur circle of light striking the record surface is $$b = \Delta t \cdot NA\left\{\left(\frac{1}{n^2 - (NA)^2}\right)^{\frac{1}{2}} - \frac{1}{2}\left(\frac{1}{1 - (NA)^2}\right)^{\frac{1}{2}}\right\} \tag{4}$$

Figure 6:
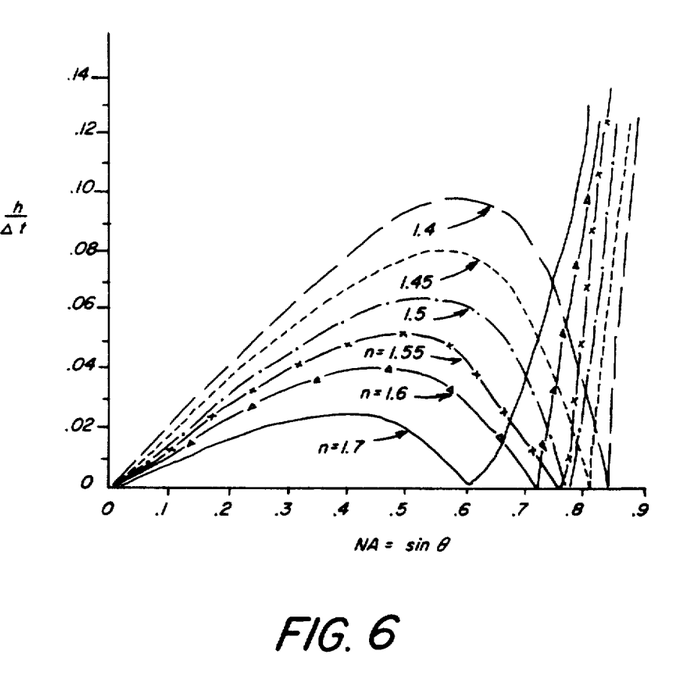
FIG. 6 is a graph which is useful in selecting preferred modes of the present invention and which indicates the variation in radius of a light beam's spherically aberrated blur circle plotted versus lens numerical aperture for various index of refraction disc support materials.

Plots of b vs NA for various values of n are given in FIG. 6 and from FIG. 6 we see that for an $n = 1.5$ support material, we can use an objective of NA as high as 0.79 and still have a blur circle of radius less than 0.065 $\Delta t$ occurring at the record surface.

The airy disc central core radius at the focus of a diffraction limited lens is given by $$r_A = \frac{0.61\lambda}{NA} \tag{5}$$

For $\lambda = 488$ nm and $NA = 0.79$, equation (5) yields $$r_A = 0.3768\mu$$

Thus, if we select $b = 0.3768\mu$, FIG. 6 shows that a properly stabilized disc having an $n = 1.5$ support material can have $\pm \Delta t \lesssim 5.79\mu$ and still have a geometrical blur circle at the back web surface that is smaller than the airy disc central core if the lens is properly positioned relative to the stabilized neutral plane of the rotating disc. FIG. 6 shows that for any index n there are NA and $\Delta t$ values which will produce reasonable blur circles at the back web surface, i.e., passive focus maintenance will occur.

Another case of interest would have $\lambda = 830$ nm, $NA = 0.5$ and $n = 1.5$. From FIG. 6 we see that for this case the blur circle radius will be on the order of 0.061 $\Delta t$. From equation (5), $r_A = 1.01\mu$. Thus we could have $\mu t \leq \pm 16.6\mu$ and not exceed the diffraction limited spot size.

Considering the foregoing, it can be seen that in accord with the present invention substantial focus compensation for thickness variation of a flying optical disc can be obtained passively if (1) the disc is rotated with its neutral plane NP substantially stabilized in a given rotational plane and (2) if the lens means and neutral plane NP are relatively located in a proper manner. Specifically, the lens means and stabilized neutral plane of the disc should be located so that there is a distance $$"x" = FL - \left(\frac{t}{n} - \frac{t}{2}\right)$$

between the lens means' second principal point and the disc's neutral plane, where FL is the focal length of the lens means, t is the nominal thickness of the disc support and n is the refractive index of the support material. This relationship is derived by solving for the second principal point to neutral plane NP distance "x" (in terms of n and t) for the nominal thickness condition. Thus (see FIG. 4), the second principal point to NP distance is:

$$x = FL - \left(L_1 - \frac{t}{2}\right) \text{ or}$$

$$x = FL - \left(\frac{t}{n} - \frac{t}{2}\right).$$

Within this arrangement support-induced spherical aberration compensates for thickness variation and precise spot-focus of write/read light on the information surface of the disc is passively enhanced.

In another preferred embodiment, not shown, the optical disc can be rotated with its support side facing the stabilizing reference surface of the write/read apparatus. In this embodiment at least a portion of the reference surface is transparent to write/read light, e.g., formed of polished glass to maintain proper aerodynamic characteristics. The write/read light source(s) are located to direct light through the stabilizing reference surface and the disc support to the information surface. In this mode the focusing lens focal length (FL) is corrected to operate through the transparent reference surface. This embodiment has the advantage of avoiding abrasion of the record layer by the reference surface. Also the read light detector can. if desired be located on the opposite side of the disc from the read light and in such instance the disc information surface need not be reflective.

One skilled in the art will appreciate that the present invention also can be used advantageously in cooperation with a low performance (i.e. low band-width) focus servo system. In such embodiments the focus servo controls adjustment of the lens means at low frequencies to initially access the discs (and thus accommodate for slight constructional differences between discs) and/or to accommodate for any changes in the vertical position of the central plane of a stabilized disc (which exist in some embodiments as a function of disc radius). In such embodiments the present invention again functions to reduce the high frequency defocus caused by thickness variation of the disc support The invention has been described in detail with particular reference to preferred embodiments thereof, but it will be understood that variations and modifications can be effected within the spirit and scope of the invention.

What is claimed is:

1. A method of writing and/or reading information on a flexible optical disc comprising a recording layer disposed on a transparent compliant substrate of refractive index n and nominal thickness t, said method comprising the steps of:
    (a) rotating the optical disc so that its neutral plane is stabilized in space;
    (b) spacing a lens of focal length FL from the said neutral plane by a distance $FL-(t/n-t/2)$; and
    (c) directing a beam of light to the recording layer through the lens and the disc substrate.

2. A method of optically writing and/or reading high-density information, said method comprising:
    (1) positioning a flexible record disc, including an information surface on a support which is substantially transparent and non-birefringent, generally flat and of generally uniform thickness, with its central portion constrained in a plane substantially normal to an axis of rotation and with its outer portion closely adjacent a highly smooth, featureless stabilizing reference surface that is axially symmetric to said axis of rotation and generally non-convex to the plane of said disc central portion constraint;
    (2) maintaining said reference surface stationary while rotating said central disc portion in said plane and about said axis at a high speed which flies said disc outer portion in closely spaced opposing relation to said stabilizing reference surface;
    (3) coupling a radially central region of the zone between said disc and said stabilizing reference surface to a gas source of pressure not substantially exceeding the ambient pressure external of said zone;
    (4) positioning a lens of focal length FL at a distance $FL-(t/n -t/2)$ from the stabilized neutral plane (NP) of the disc, where n is the refractive index and t is the nominal thickness of the disc's support;
    (5) directing a beam of light for writing and/or reading through said lens and said support into precise spot-focus on the information surface of said rotating record disc, whereby support-induced spherical aberration compensated for support thickness variation and precise spot-focus on said information surface is passively enhanced.

3. Apparatus for optically writing or reading high-density information on a record disc including an optical record surface on a flexible disc support which is substantially transparent and non-birefringent, generally flat and of generally uniform thickness, said apparatus comprising:
    (a) rotatable means for positioning such record disc in centered relation to a rotational axis and for engaging and retaining a central portion of the disc in a plane precisely normal to the rotational axis;
    (b) stationary means defining a highly smooth, featureless, stabilizing reference surface that is axially symmetric to said rotational axis and non-convex to said normal plane;

(c) means for rotating said rotatable means at a high speed which flies the outer portion of an engaged disc in closely spaced relation to said stabilizing surface;

(d) means for coupling a radially central region of the zone between said stabilizing reference and an engaged disc to a gas source not substantially exceeding the ambient pressure external of said zone; and (e) lens means located to direct a writing or reading light beam through the support and into precise spot-focus on the record surface of such rotated disc, said lens means being spaced a distance $FL-(t/n-t/2)$ from the neutral plane of the stabilized disc, where FL is the focal length of said lens means and t and n are respectively the nominal thickness and refractive index of the disc support, whereby support-induced spherical aberration compensates for support thickness variation and precise spot-focus on said information surface is passively enhanced.

4. Apparatus for optically writing and/or reading high-density information, said apparatus comprising:

(a) a record disc including a record surface on a flexible support which is substantially transparent and non-birefringent with respect to said write and/or read wavelengths, substantially flat and of substantially uniform thickness;

(b) rotatable means for positioning such record disc in centered relation to a rotational axis and for engaging and retaining a central portion of the disc in a plane precisely normal to the rotational axis;

(c) stationary means defining a highly smooth, featureless, stabilizing reference surface that is axially symmetric to said rotational axis and non-convex to said normal plane;

(d) means for rotating said rotatable means at a high speed which flies the outer portion of an engaged disc in closely spaced relation to said stabilizing surface;

(e) means for coupling a radially central region of the zone between said stabilizing reference and an engaged disc to a gas source not substantially exceeding the ambient pressure external of said zone; and (f) lens means for directing a beam of writing or reading light through said support and into precise spot-focus on the record surface of a rotated disc, said lens means being spaced a distance $FL-(t/n-t/2)$ from the neutral plane of a stabilized disc, where FL is the focal length of said lens means and t and n are respectively the nominal thickness and refractive index of the disc support, whereby support-induced spherical aberration compensates for support thickness variation and precise spot-focus on said information surface is passively enhanced.

* * * * *